Sept. 15, 1931. L. FRIEDRICH 1,823,799
SAFETY ATTACHMENT FOR AIRCRAFT
Filed Jan. 28, 1930
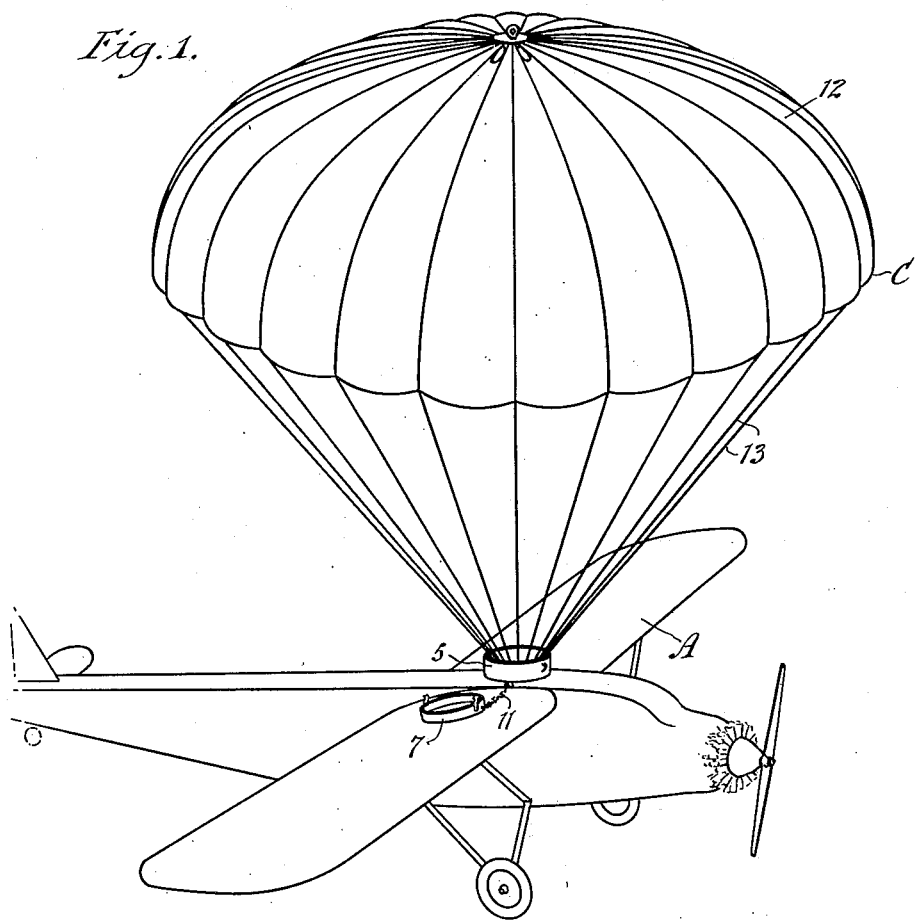
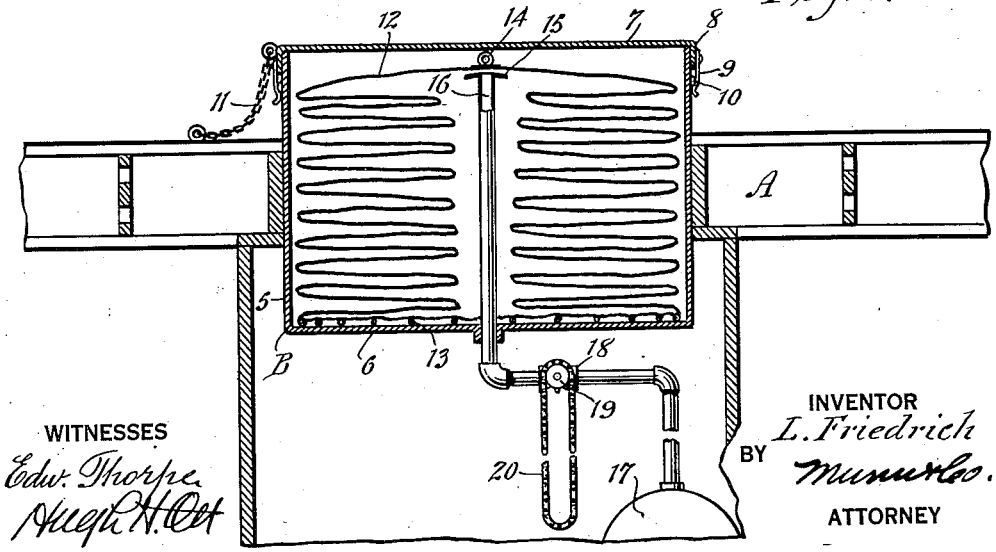

Patented Sept. 15, 1931

1,823,799

UNITED STATES PATENT OFFICE

LOUIS FRIEDRICH, OF YONKERS, NEW YORK

SAFETY ATTACHMENT FOR AIRCRAFT

Application filed January 28, 1930. Serial No. 424,033.

This invention relates to aircraft, and comprehends a safety attachment for aeroplanes or other aircraft, particularly those of the heavier-than-air type.

Broadly, the invention comprehends an improvement in parachute attachments for aeroplanes which are designed to function in an emergency as a means to control the descent and to effect a safe landing of the plane. More specifically, the invention resides in the provision of an attachment of the character set forth which includes a closed container for the parachute whereby the same is normally housed in such a manner as to be protected from damage while offering no material interference or resistance to the ordinary operation of the aeroplane.

The invention furthermore comprehends means located within the container or housing for the parachute and within the folded portion of the envelope for supporting said envelope in a position to be rapidly ejected from the container for instantaneous use when the occasion requires.

Other objects of the invention reside in the comparative simplicity of construction of the attachment, the economy with which the same may be produced and installed on the craft and the general efficiency derived therefrom.

With the above recited and other objects in view, reference is had to the following description and accompanying drawings, in which there is exhibited one example or embodiment of the invention while the claims define the actual scope of the same.

In the drawings:

Figure 1 is a perspective view illustrating an aeroplane equipped with a safety attachment constructed in accordance with the invention and showing the parachute in active use.

Figure 2 is a fragmentary sectional view through the aeroplane structure and the container with the parachute in its inactive position therein.

Referring to the drawings by characters of reference, A designates generally the aeroplane or aircraft in which is suitably mounted and supported a container or housing B for receiving a parachute C when the same is in an inactive position. The container consists of a body 5 which is provided with a closed bottom 6 and a displaceable cover 7 at the upper open end of the body, which cover is preferably provided with a depending marginal flange 8 adapted to telescopically fit over the upper open end of the body and which cover is retained in place by suitable latch elements 9 which engage with keepers 10 on the body 5. The latch elements are of such a nature that they will normally retain the cover in closed position against accidental displacement and, in practice, the cover is preferably anchored by a flexible element 11 to the aeroplane structure or to the body 5, if desired, to prevent the loss of the cover. The parachute includes the usual envelope or canopy 12 to which the cords or shrouds 13 are attached in circumferentially arranged position at the lower edge of the envelope, said cords or shrouds extending down into and suitably attached to the bottom 6 of the container or housing 5. At the central portion, the envelope has secured thereto an attaching eye 14, the purpose of which will be hereinafter set forth. The envelope or canopy 12 is normally folded to lie within the container 5, together with the shrouds or cords 13, and the central portion of the envelope or canopy to which the eye 14 is secured is disposed centrally over the upper flanged end 15 of a pipe or conduit 16 which leads downwardly and axially through the body 5 of the container or housing and through the bottom wall 6 thereof. The pipe or conduit 16 is led to and communicates with a source of compressed air or other fluid under pressure contained in a tank 17. A valve 18 is arranged in the conduit and is normally closed to prevent the flow of the pressure from the tank to the outlet end 15 of the conduit 16. A suitable valve actuating mechanism, such as the sprocket 19 and sprocket chain 20, is employed for the purpose of opening the valve from a point adjacent the pilot's seat.

In use and operation, when it is desired to render the safety attachment active, the pilot or operator opens the valve 18, permitting the pressure to exert its force against the envelope or canopy 12, and this force will be sufficient to disengage the latches 9 from the keepers 10 by lifting the lid or cover 7 and forcibly projecting the parachute outwardly through the upper open end of the body 5 of the container or housing. At the same time, the pressure or force will tend to rapidly and instantly open the envelope or canopy 12 to dispose the parachute in an active position for controlling the descent of the aeroplane for the purpose of effecting a safe landing, due to the failure of the motor or to right the plane where control of the same is lost by the pilot. Obviously, when the cover 7 is blown off, the flexible anchoring element 11 will prevent the loss of the cover. After the plane is landed, the envelope may be again properly folded into the body 5 of the receptacle by engaging suitable overhead tackle with the eye 14 which is designed for the purpose of facilitating the replacement of the parachute in the housing.

What is claimed is:

1. In a safety attachment for aircraft, a parachute, a rigid container having an open end, said container being carried by and secured to the craft within which the parachute is arranged in a folded inactive condition with the parachute shrouds anchored therein, a rigid cover telescopically fitting the open end of the container, a flexible element anchoring the cover to the craft, frictional latch means for maintaining the cover in closed relation to the open end of the container, a conduit extending into the container having an outlet disposed within the parachute envelope and adjacent the cover to constitute means for directing a fluid pressure within the envelope and container functioning to simultaneously inflate and open the envelope and to displace the container cover and means centrally and exteriorly of the parachute envelope for facilitating the replacement of the parachute in its container.

2. In a safety attachment for aircraft, a parachute, a rigid container having an open end, said container being carried by and secured to the craft within which the parachute is arranged in a folded inactive condition with the parachute shrouds anchored therein, a rigid cover telescopically fitting the open end of the container, a flexible element anchoring the cover to the craft, frictional latch means for maintaining the cover in closed relation to the open end of the container, a conduit extending into the container having an outlet disposed within the parachute envelope and adjacent the cover to constitute means for directing a fluid pressure within the envelope and container functioning to simultaneously inflate and open the envelope and to displace the container cover and means centrally and exteriorly of the parachute envelope for facilitating the replacement of the parachute in its container, said means consisting of an eye anchored to the envelope.

LOUIS FRIEDRICH.